W. H. McINTYRE.
AUTOMOBILE BODY ATTACHMENT.
APPLICATION FILED FEB. 10, 1919.
1,310,425.
Patented July 22, 1919.
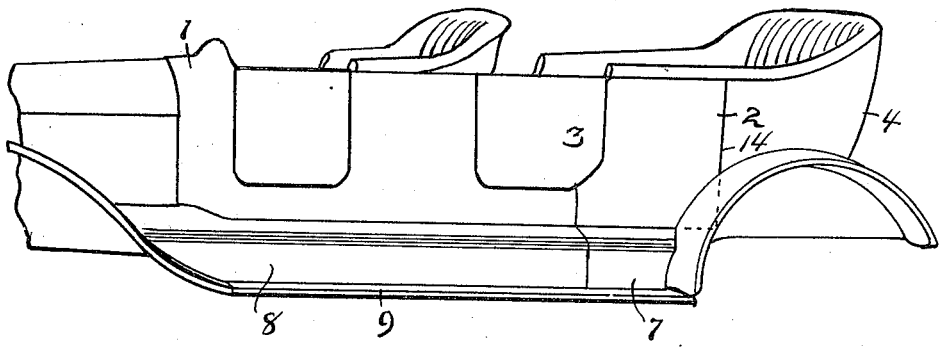
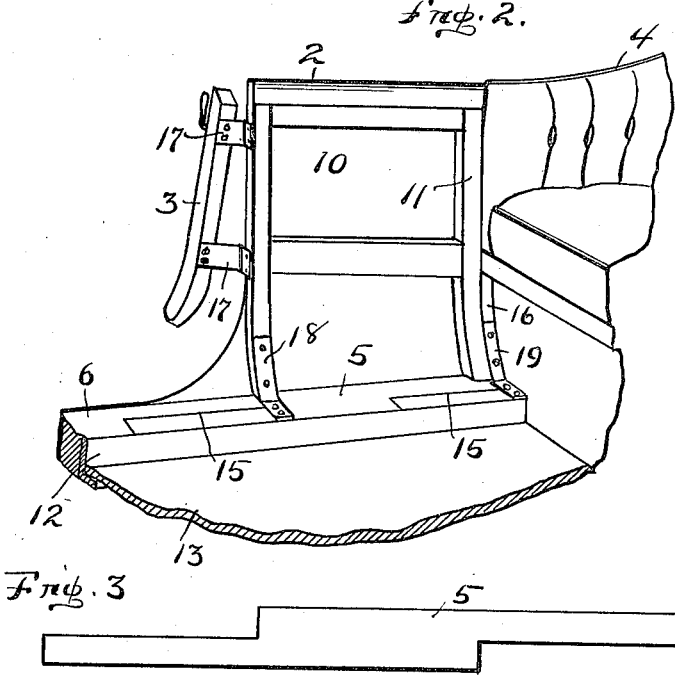

UNITED STATES PATENT OFFICE.

WILLIAM H. McINTYRE, OF CHICAGO, ILLINOIS.

AUTOMOBILE-BODY ATTACHMENT.

1,310,425.  Specification of Letters Patent.  Patented July 22, 1919.

Application filed February 10, 1919. Serial No. 275,943.

*To all whom it may concern:*

Be it known that I, WILLIAM H. McINTYRE, a citizen of the United States of America, and resident of Chicago, in the county of Cook and State of Illinois, have invented certain new and useful Improvements in Automobile-Body Attachments, of which the following is a specification.

This invention relates to improvements in automobile body attachments and the object thereof is to provide an attachment for automobile bodies by means of which a body originally constructed of standard form for a carrying capacity of five passengers may be readily increased to a form suited to accommodation of seven passengers, the intention being to effect the required alterations expeditiously and with but few additional parts.

The object of the invention is accomplished by the construction illustrated in the accompanying drawings in which:—

Figure 1 is a perspective view showing broadside an automobile body to which the present invention has been applied;

Fig. 2 is a detail view in perspective showing an interior view of the added section to one side of the body and also the splice made in the frame thereof; and Fig. 3 is a plan view of an insert used in splicing the frame of the body.

Similar characters of reference indicate corresponding parts throughout the several views and having reference now to the same:

1 is an automobile body of usual construction into which has been introduced upon each of its sides an inserted section 2 between the corresponding rear door 3 and the back portion 4 of the body. The sections are formed in pairs to suit the right and left side curvature of the body and each section includes an insert 5 at its lower portion adapted to be fitted in the corresponding sill 6 which is cut in a manner to receive it. Also, an apron insert 7 is applied to lengthen the original apron 8, and the original run-board (not shown) is replaced by a run-board 9 of greater length to extend the outboard portion of the body correspondingly.

Each section is formed with an external plate 10 which is attached to the exterior face of the frame 11, and the latter affords support for the plate and also the door 3 which is hinged to the front edge thereof. The frame also forms a base to which is secured upholstery (not shown).

Each sill 6 is reinforced upon its inner side by the angle-iron 12 that extends along the sill and overlaps the splices formed between the insert 5 and the adjacent ends of the sill. The angle-irons also serve to support the floor 13.

The frame 11 of each section 2 is anchored to the sill 6 and its insert by an iron brace 18 similar to the brace 19 that secures the abutting frame of the back portion of the body, so that the section is held rigidly in fixed position.

In applying the invention to a body, the doors 3 are removed from connection with the back 4, and the back of the body is cut apart from the forward portion along the vertical lines 14, and also the sills are parted along the angle lines 15 so as to fit the inserts 5 which are secured between the corresponding adjacent ends of the sills. The inserted sections 2 are then secured with their rear edges abutting against the frame 16 of the back of the body, and the doors 3 are secured by hinges 17 to the forward edges of the frames of the inserted sections respectively. Thus, each inserted section is positioned interveningly between the door and the back of the body. In this manner the body is lengthened so as to accommodate a greater number of passengers without impairment of the general design of the body.

What I claim is:—

1. An automobile body having upon each side thereof an inserted section between the rear door and the back of the body and a corresponding insert applied in the adjacent sill.

2. In an appliance of the class described, a section for an automobile body adapted to be applied by separating the body between the rear doors and its back portion and securing said section with its rear edge abutting the back of the body, said section being also adapted to afford support for the door; and an insert for the lower portion of each side of the body.

In testimony whereof I affix my signature, in presence of two witnesses.

WILLIAM H. McINTYRE.

Witnesses:
 EDWIN T. MAECHTLE,
 F. D. REDDEN.

Copies of this patent may be obtained for five cents each, by addressing the "Commissioner of Patents, Washington, D. C."